(12) United States Patent
Gaultney (10) Patent No.: US 8,584,714 B2
(45) Date of Patent: Nov. 19, 2013

(54) MULTI-PRODUCT DISPENSING SYSTEM FOR GRANULAR MATERIALS

(75) Inventor: Lawrence Doka Gaultney, Elkton, MD (US)

(73) Assignee: E I du Pont de Nemours and Company, Wilmington, DE (US)

( * ) Notice: Subject to any disclaimer, the term of this patent is extended or adjusted under 35 U.S.C. 154(b) by 614 days.

(21) Appl. No.: 12/746,766

(22) PCT Filed: Dec. 10, 2008

(86) PCT No.: PCT/US2008/086112
§ 371 (c)(1),
(2), (4) Date: Jun. 8, 2010

(87) PCT Pub. No.: WO2009/076375
PCT Pub. Date: Jun. 18, 2009

(65) Prior Publication Data
US 2011/0041952 A1    Feb. 24, 2011

Related U.S. Application Data

(60) Provisional application No. 61/012,520, filed on Dec. 10, 2007.

(51) Int. Cl.
*B65B 1/32* (2006.01)
*B65B 1/30* (2006.01)
*B01F 15/04* (2006.01)

(52) U.S. Cl.
CPC .................................. *B01F 15/0445* (2013.01)
USPC ................ 141/83; 141/104; 141/100; 222/77

(58) Field of Classification Search
CPC .................................................. B01F 15/0445
USPC ................. 141/83, 94, 95, 99, 100, 104, 192; 137/557; 222/77
See application file for complete search history.

(56) References Cited

U.S. PATENT DOCUMENTS 3,822,056 A    7/1974   Hawes, Jr. et al.
4,320,775 A *  3/1982   Stirling et al. .................... 137/3
(Continued)

FOREIGN PATENT DOCUMENTS

EP     1378293 A1    1/2004
WO     WO96/35635    11/1996
(Continued)

OTHER PUBLICATIONS

"Focus on Weighing Equipment", Food Engineering, 2000, 29-59.
(Continued)

*Primary Examiner* — Timothy L Maust
*Assistant Examiner* — Robert Bell, III (57) ABSTRACT

A dispensing system for granular materials, in particular agricultural products, capable of dispensing multiple products that comprises a control means for entering a product formula, hoppers that contain material for formulating the product each having a dispensing means controlled by the control means, material is fed from each hopper through a tube and fed into a housing having a rotatable structure that allows the material to be dispensed into a receptacle connected to a weighing means and weighed and feedback means connected to the weighing means and to the control means feeds weight information to the control means which adjusts the dispensing of the material from each of the hoppers as necessary to accurately formulate a product.

21 Claims, 8 Drawing Sheets

(56) References Cited

U.S. PATENT DOCUMENTS

| | | | |
|---|---|---|---|
| 5,240,324 | A | 8/1993 | Phillips et al. |
| 5,603,458 | A | 2/1997 | Sandolo |
| 5,627,346 | A | 5/1997 | Weibel et al. |
| 5,632,449 | A | 5/1997 | Sandolo |
| 5,674,005 | A | 10/1997 | Corey et al. |
| 5,685,435 | A | 11/1997 | Picioccio et al. |
| 5,690,283 | A | 11/1997 | Sandolo |
| 5,738,153 | A | 4/1998 | Gerling et al. |
| 5,853,244 | A | 12/1998 | Hoff et al. |
| 5,997,236 | A | 12/1999 | Picioccio et al. |
| 6,188,936 | B1 * | 2/2001 | Maguire et al. ............... 700/265 |
| 6,253,959 | B1 * | 7/2001 | Gaultney et al. ............... 222/55 |
| 6,349,889 | B1 | 2/2002 | Sandolo |
| 6,397,655 | B1 * | 6/2002 | Stephenson .................... 73/1.72 |
| 6,474,372 | B2 * | 11/2002 | Sanderson et al. .............. 141/83 |
| 6,725,889 | B2 * | 4/2004 | Perez Vales .................. 141/104 |
| 6,776,200 | B2 * | 8/2004 | Dronsejko et al. ............ 141/198 |
| 7,075,019 | B2 | 7/2006 | Bergman et al. |
| 7,137,729 | B2 | 11/2006 | Moretto |
| 7,527,078 | B2 * | 5/2009 | Driessen et al. .................. 141/9 |
| 2004/0025703 | A1 | 2/2004 | Ming |
| 2005/0092389 | A1 * | 5/2005 | Mazur et al. .................. 141/100 |
| 2005/0210834 | A1 | 9/2005 | Kamineni |
| 2007/0253286 | A1 | 11/2007 | Huang |

FOREIGN PATENT DOCUMENTS

| | | |
|---|---|---|
| WO | WO98/05932 | 2/1998 |
| WO | WO2004/049877 A1 | 6/2004 |
| WO | WO2007/036096 A1 | 4/2007 |

OTHER PUBLICATIONS

"Tiny blender produces custom blends", Powder and Bulk Engineering, 2007, 54-59.

"Snack baker installs flexible line for quick response. (Pretzels Inc.)", Chilton's Food Engineering, 2007, 52-54 v66, n3.

"Filling and Processing in the Electronic Age", Cosmetics & Toiletries Manufactures & Suppliers, 1994, 41-49, Morgan-Grampian Ltd.

* cited by examiner

MULTI-PRODUCT DISPENSING SYSTEM FOR GRANULAR MATERIALS

This application is a national stage entry of PCT/US08/86112, filed Dec. 10, 2008. PCT/US08/86112 claims priority benefit from Provisional Application 61/012,520, filed Dec. 10, 2007.

FIELD OF THE INVENTION

The present invention relates to a multi-product dispensing system for granular products and in particular for granular agricultural products.

BACKGROUND OF THE INVENTION

Systems for mixing and dispensing bulk materials to form products are known and shown, for example, in U.S. Pat. Nos. 5,685,435 and 5,997,236 to Picioccio et al. which illustrate a plurality of bins for dispensing materials under the control of a dispensing system that allows a customer to select a product or group of products to be dispensed.

Material is dispensed from each bin according to the customer's selection and the dispensed materials are mixed to form the selected product. Similarly, coffee blending apparatuses are known as shown in U.S. Pat. Nos. 5,603,458 and 6,349,889 to Sandolo wherein various types of coffee beans are dispensed from different containers and optionally ground together to form the desired coffee mixture selected by a customer. US2005/0210834 to Kamineni is directed to an apparatus and method for manufacturing customized pharmaceutical dosages by mixing and blending pharmaceutical compounds to formulate a particular product.

None of the current systems available are suitable for mixing granular agricultural products which require a system that is very accurate, prevents cross contamination of ingredients and has safeguards in the event of an electrical power failure to insure that no improper dispensing of ingredients occurs. In agricultural products even very minor amounts of ingredients can cause severe crop damage or a complete crop failure.

Therefore, the development of an effective multi-product dispensing system for granular products and in particular for granular agricultural products, which can accurately dispense the correct amount of ingredients to form a product, prevents contamination of the product with unwanted ingredients, and has safeguards built-in to prevent inaccurate dispensing of ingredients in the event of an equipment failure, is desirable. A new dispensing system that can facilitate the dispensing of granular products has now been discovered.

SUMMARY OF THE INVENTION

This invention provides a system for dispensing a granular product, comprising:
  means for controlling the system;
  means for containing at least two granular materials in a separate arrangement;
  means for dispensing each granular material from the containing means in electrical communication with the control means and capable of holding and releasing the granular material;
  means for directing the granular material comprising a housing, a rotatable structure having an opening therein and means for rotating the structure;
  means for receiving the granular material in axial alignment with the opening in the rotatable structure;
  means for transferring the granular material from the containing means to the receiving means, said transferring means comprising a tube having two open ends, one open end attached to the dispensing means and the opposite open end capable of close alignment with the opening in the rotatable structure;
  means for holding the receiving means; and
  means for weighing the receiving means in contact with the holding means and in electrical communication with the control means;
  whereby the granular product to be prepared is selected by supplying information to the control means, granular material is dispensed from the containing means by the dispensing means as directed by the control means according to a formula for the selected product, the granular material flows through the transferring means, the rotating means moves the rotatable structure to align the opening in the rotatable structure with the open end of the tube capable of close alignment with the opening in the rotatable structure thereby allowing a discharge of the granular material into the receiving means through the opening in the rotatable structure, the weighing means weighs the amount of granular material dispensed into the receiving means and feeds the weight data to the control means and the control means directs the dispensing means to dispense additional granular material when required; the above being repeated for each granular material in the containing means required by the formula for the selected product.

BRIEF DESCRIPTION OF THE FIGURES

The accompanying drawings, which are incorporated in and constitute a part of the specification, illustrate embodiments of the invention and, together with the general description given above and the detailed description of embodiments given below, serve to explain the principles of the invention.

In the accompanying drawings given by way of example:

FIGS. 4A and 4B are cross sectional views of embodiments of the granular dispensing apparatus of the present invention illustrating a rotatable structure taken along sections 4-4 in FIG. 3. In FIG. 4A is shown an opening in a rotatable plate wherein the entrance and the exit are in direct axial alignment. In FIG. 4B is shown an opening wherein the entrance and the exit are angled enabling granular material to exit the rotatable structure at a position closer to the center of the rotatable structure.

FIG. 7A shows an unlocked position, and FIG. 7B shows a locked position.

FIGS. 8A and 8B are partial, cross-sectional views of one embodiment of the granular dispensing apparatus of the present invention illustrating an output transfer valve capable of enabling one-way material flow. FIG. 8A shows drop pins in a secured position preventing material flow, and FIG. 8B shows drop pins in an unsecured position permitting material flow.

FIG. 9A shows the valve in an open position, and FIG. 9B shows the valve in a closed position.

DETAILED DESCRIPTION OF THE INVENTION

As used herein, the terms "comprises," "comprising," "includes," "including," "has," "having," "contains" or "containing," or any other variation thereof, are intended to cover a non-exclusive inclusion. For example, an apparatus, article, system, method or process that comprises a list of elements is not necessarily limited to only those elements but may include other elements not expressly listed or inherent to such apparatus, article, system, method or process. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

Embodiments of the present invention as described in the Summary of the Invention include:

Embodiment 1: A system described in the Summary of the Invention wherein the containing means comprises at least two hoppers and optionally means for identifying the granular material in each hopper.

Embodiment 2: The system of Embodiment 1 wherein the hopper identifying means is a radio frequency identification chip or a bar code attached to each hopper.

Embodiment 3: The system of Embodiment 1 wherein the dispensing means is attached to each hopper and comprises a valve assembly being held in its closed position by the weight of the granular material in the reservoir and on actuation to its open position by the control means dispenses the amount of granular material from the reservoir required by the formula for the selected product.

Embodiment 3a: The system of Embodiment 3 wherein the dispensing means further comprises a transfer valve and a reservoir disposed between the hopper and the valve assembly.

Embodiment 3b: The system of Embodiment 3a wherein the transfer valve comprises an output transfer valve and an input transfer valve.

Embodiment 3c: The system of Embodiment 3b wherein the output transfer valve and the input transfer valve are product-specific.

Embodiment 3d: The system of Embodiment 3c wherein the output transfer valve is one-way.

Embodiment 4: The system of Embodiment 3 wherein the valve assembly is further held in its closed position by a spring.

Embodiment 5: The system of Embodiment 1 wherein the transferring means comprises a plastic tube, a rubber tube or a metal tube for each hopper.

Embodiment 5a The system of Embodiment 5 wherein the transferring means is disposed between the dispensing means and the directing means.

Embodiment 6: The system of Embodiment 1 wherein the rotatable structure is a rotatable plate and the opening in the rotatable structure is surrounded by a ridge.

Embodiment 6a: The system of Embodiment 6 wherein the entrance and the exit of the opening in the rotatable plate are in direct axial alignment.

Embodiment 6b: The system of Embodiment 6 wherein the entrance and the exit of the opening in the rotatable plate are angled to allow granular material to exit the rotatable plate at a position closer to the center of the rotatable plate.

Embodiment 6c: The system of Embodiment 6 wherein the rotatable plate further comprises a slot disposed along the circumference of the rotatable plate and capable of alignment with a corresponding slot in the housing.

Embodiment 7: A system described in the Summary of the Invention wherein the rotating means is a motor in electrical communication with the control means.

Embodiment 8: A system described in the Summary of the Invention wherein the receiving means is a receptacle optionally having means for identifying the selected product attached thereto.

Embodiment 9: The system of Embodiment 8 wherein the receptacle identifying means is a radio frequency identification chip or a bar code.

Embodiment 10: The system of Embodiment 1 wherein the dispensing means for each hopper is electrically activated.

Embodiment 11: The system of Embodiment 10 wherein the rotatable structure has a magnet or cam lobe thereon and the electrical activation is preceded by actuation of a magnetic or mechanical switch upon placement of the magnet or cam lobe adjacent to a filling station.

Embodiment 12: The system of Embodiment 10 wherein the dispensing means is an electrically operated opening mechanism that is opened with an electrical surge and remains open at a lower voltage.

Embodiment 13: The system of Embodiment 12 wherein the electrical surge ranges from about 7 volts to about 17 volts and the lower voltage ranges from about 1 volt to about 5 volts.

Embodiment 14: The system of Embodiment 8 or 9 wherein the control means is connected to means for printing capable of printing a label containing information about the selected product for attaching to the receptacle.

Embodiment 15: A system described in the Summary of the Invention wherein the control means stores information about the selected product, said information selected from the group consisting of a formula, a customer name and related data, cost data, a formulated date and an expiration date, and combinations of any of the foregoing, and said control means is optionally connected to a computer.

Embodiment 16: A system described in the Summary of the Invention wherein the selected product is an agricultural product.

Embodiment 17: The system of Embodiment 16 wherein the control means is connected to a computer upon which is stored data for existing products and upon which is entered new information selected from the group consisting of a change in a crop to be protected, a change in a region where the agricultural product is to be applied, and a change in a pest or a weed to be controlled, whereby the computer generates a new formula for a new agricultural product and feeds the new formula to the control means thereby allowing the system to dispense the new agricultural product.

Also of note is a method for preparing a granular material product which utilizes the system herein described. Of particular note is a method of using the system to prepare an agricultural product. Agricultural products include crop protection agents, such as herbicides, fungicides, bactericides, arthropodicides, nematocides and molluscicides, and also nutrients such as fertilizers.

Embodiments attributed herein for the system are also applicable to the method. In one embodiment the method is utilized for the preparation of a granular material product comprising at least two different granular materials and comprises the following steps: placing a quantity of granular material into at least two hoppers of the system described herein; discharging a portion of the granular material from at least two hoppers into the reservoir for each discharging hopper; rotating the rotatable structure of said system to place its opening at a position in alignment for receiving the first granular material to be dispensed; dispensing the first granular material from the reservoir into a receptacle as directed by the controller based on a formula for the selected product until the weighing means signals the controller that the correct amount has been reached; and continuing the cycle until the correct amount of each granular material required by the formula for the selected product is dispensed into the receptacle.

The present invention is directed to a granular product dispensing system and can be more fully understood from the figures and explanation thereof that provide details and embodiments of the invention. Of particular note is a system for dispensing a granular agricultural product.

Figure 1:
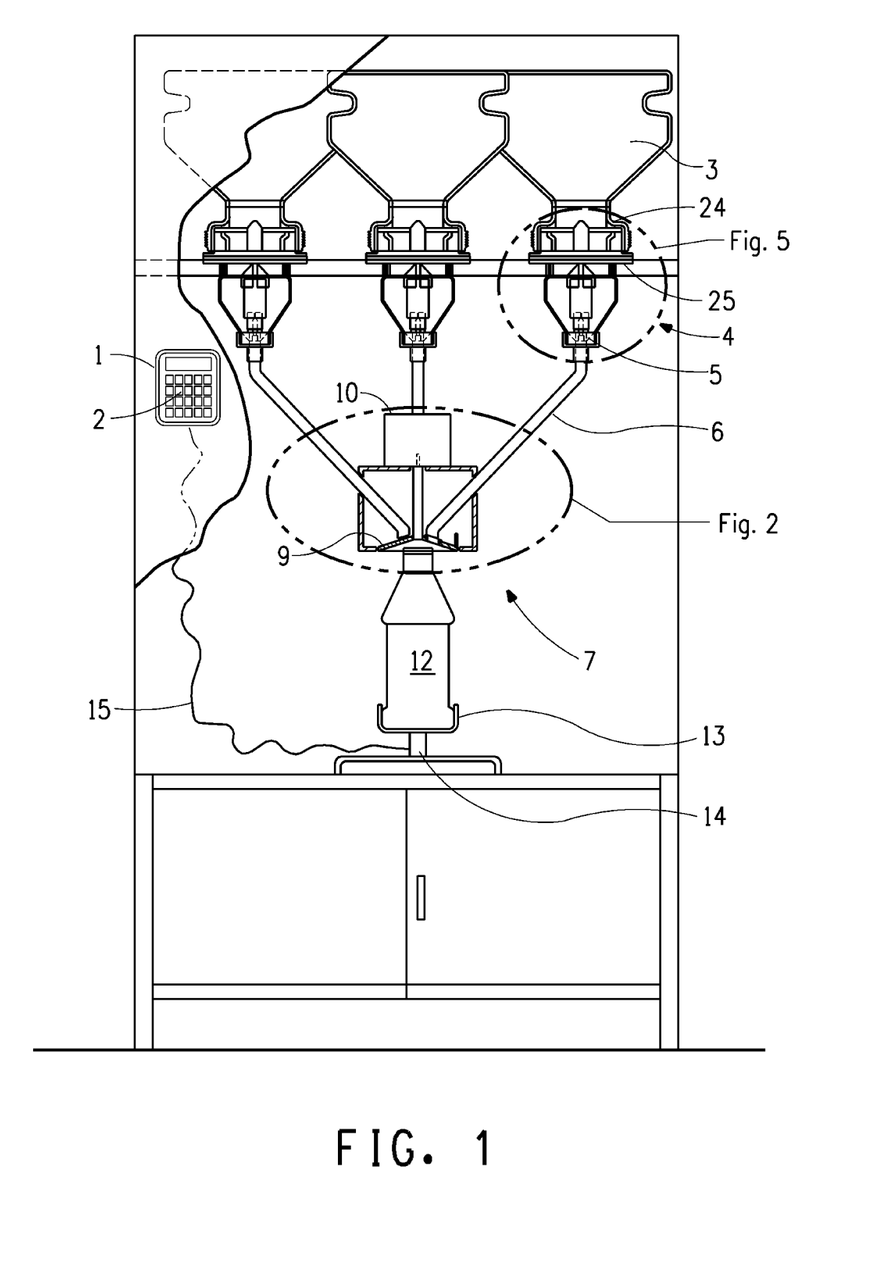
FIG. 1 is a front elevation view of a granular dispensing system in accordance with one embodiment of the present invention.

FIG. 1 is a front elevation view of a system according to the present invention and illustrates elements thereof. A control means 1 typically a Model No. SUCB Precision Pac Controller from Flowserve Corp. Memphis, Tenn., which can be programmable, having a keypad 2 is connected to and controls elements of the system. In the control means can be stored formulae for products that can be selected. Thus, the system is capable of dispensing multiple products, e.g. products that comprise different types and/or amounts of granular materials. Each stored formula can include the identity of each granular material required for a selected product, its location, e.g. within which hopper it resides, and the amount of each granular material required for a particular product. An operator selects a product to be prepared by entering a number, code or the like for the product via the keypad 2. The control means then directs the system in dispensing the amount and type of granular material in a sequence of steps to prepare the selected product based on the formula.

The control means can comprise input and output means, data processor means and related electronic components. Input means can comprise, for example, push buttons, a numeric or alphanumeric keypad, a touch-sensitive tablet or display screen, or voice recognition. Output means can comprise, for example, indicator lights, a LCD or other display, or voice synthesis. Data processor means typically comprises a central processing unit microprocessor or application specific integrated circuit together with memory either on the same semiconductor chip or on other semiconductor components. The function of the control means can comprise controlling aspects of the operation of the present system including weighing granular material, dispensing granular material, and providing product identification checks by providing a means for inputting operational commands using, for example, source code written in C++ which conserves memory space and therefore space on and weight of the controller. The control means can have a non-volatile memory capacity to store records, for example, using Assembly Language, pertaining to dispensing history and further comprise means to transmit records in a form, such as an Excel spreadsheet, compatible with downloading to a portable computer. Alternatively, a portable computer can be used as the control. The present system can further comprise a printer. One of ordinary skill in the art can provide the programming for performing the various functions described above. Alternatively, the above controller operations can be performed manually by an operator.

Containing means for at least two granular materials in separate arrangement is typically provided by hoppers 3. Hoppers can be fabricated from rigid materials or can be flexible bags. In one embodiment the flexible bags are made from plastic materials, which can be laminated of two or more plies, having one or more beneficial properties such as durability, temperature resistance, chemical resistance, moisture resistance, UV resistance, cold weather resistance, child-resistant, high burst strength, puncture resistance, resistance to tearing, and printable. Suitable plastic materials for flexible bags include nylon, polyethylene, and ethylene vinyl acetate. In a notable embodiment the flexible bags are made from Valéron strength films. FIG. 1 shows three hoppers 3 but the system can contain up to six hoppers or more depending on the number of different granular materials that are required to prepare the selected product. By "separate arrangement" is meant that each granular material remains in its respective hopper and does not come into physical contact with the granular material in any other hopper prior to their combination in the receptacle, e.g. no opportunity for cross contamination between the hoppers.

Attached to each hopper 3 is a dispensing means 4. Dispensing means 4 is in electrical communication with control means 1 and is capable of holding and releasing the granular material. In one embodiment the dispensing means comprises reservoir 18, a transfer valve disposed between the reservoir and the hopper, and valve assembly 5 that is held in its closed position by the weight of the granular material in the reservoir 18 and on actuation to its open position by the control means 1 dispenses the amount of granular material from the reservoir 18 that is required to prepare the selected product.

Figure 5:
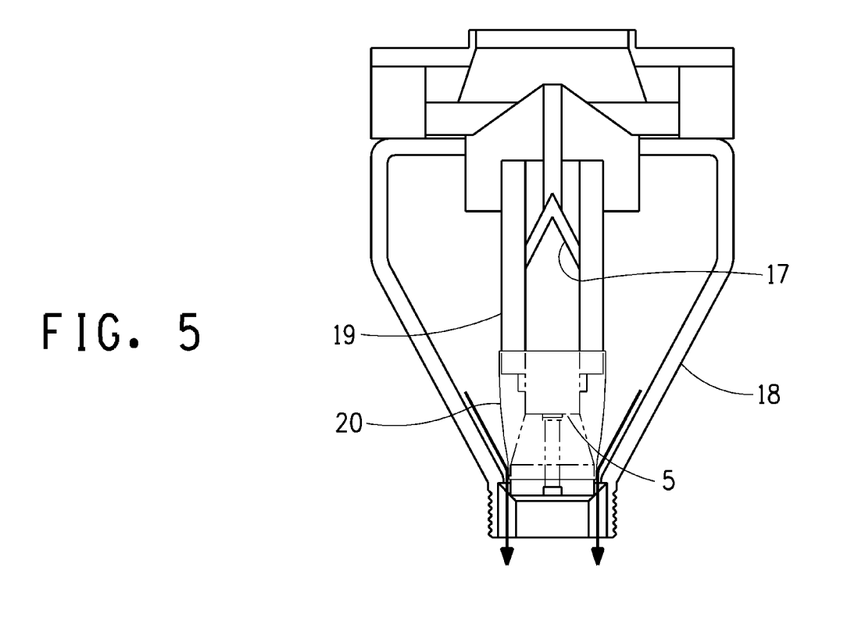
FIG. 5 is a partial cross sectional view of one embodiment of the granular dispensing apparatus of the present invention illustrating a dispensing valve in an open position.

FIG. 5 shows a typical dispensing means (shown in FIG. 1 as 4) used to dispense the granular material from a hopper 3 and comprises a reservoir 18 and a valve assembly 5. The dispensing means can further comprise a transfer valve disposed between the hopper and the reservoir. Suitable transfer valves are described in U.S. Pat. Nos. 5,738,153 and 7,075,019 (both incorporated by reference herein). In particular U.S. Pat. No. 7,075,019 describes a transfer valve of note which can be capable of enabling one-way material flow and/or can ensure product specificity.

In one embodiment a transfer valve comprises an output transfer valve and an input transfer valve. Output transfer valve is attached to the hopper and is capable of mating with the input transfer valve. The input transfer valve is disposed between the output transfer valve and the reservoir.

As shown in FIGS. 7A and 7B and FIGS. 8A and 8B, output transfer valve 24 comprises outer shell 24*a*, upper inner unit 24*b*, drop pins 42, lower inner unit 24*c* having drop pin cavities 42*a* which unit corresponds to output slide gate 31*a*. Upper inner unit 24*b* and lower inner unit 24*c* with drop pins 42 disposed within drop pin cavities 42*a* can be fastened together using, for example, one or more bolts and nuts or similar fasteners, such as screws or pins. Input transfer valve 25 comprises inner transfer valve member 25*a* and valve tab 29 rotatably attached thereto, for example using one or more of a rivet, screw, bolt, nut, nail, pin, or similar fastener. Valve tab 29 must be capable of rotation movement in order to open or close the output and input transfer valves to allow or prevent the flow of material.

Figure 7A:
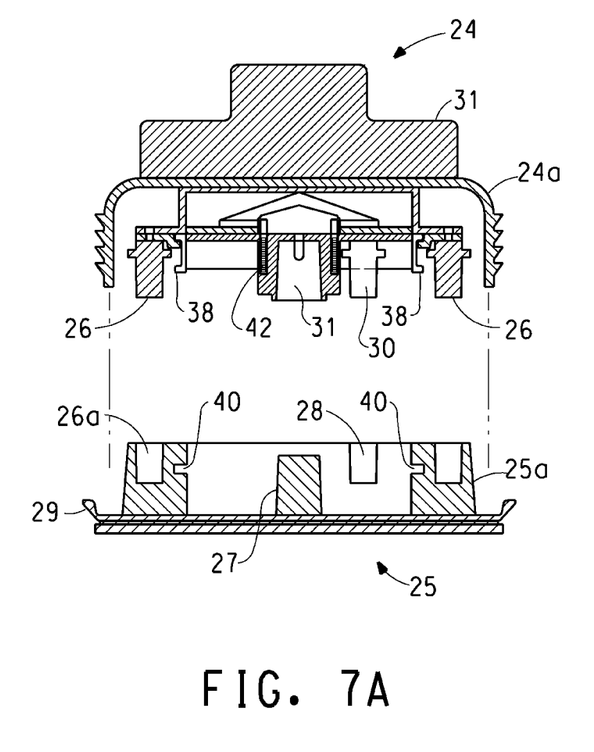
FIGS. 7A and 7B are partial, cross-sectional views of one embodiment of the granular dispensing apparatus of the present invention illustrating a fastening means for locking an output transfer valve and an input transfer valve together.
Figure 9A:
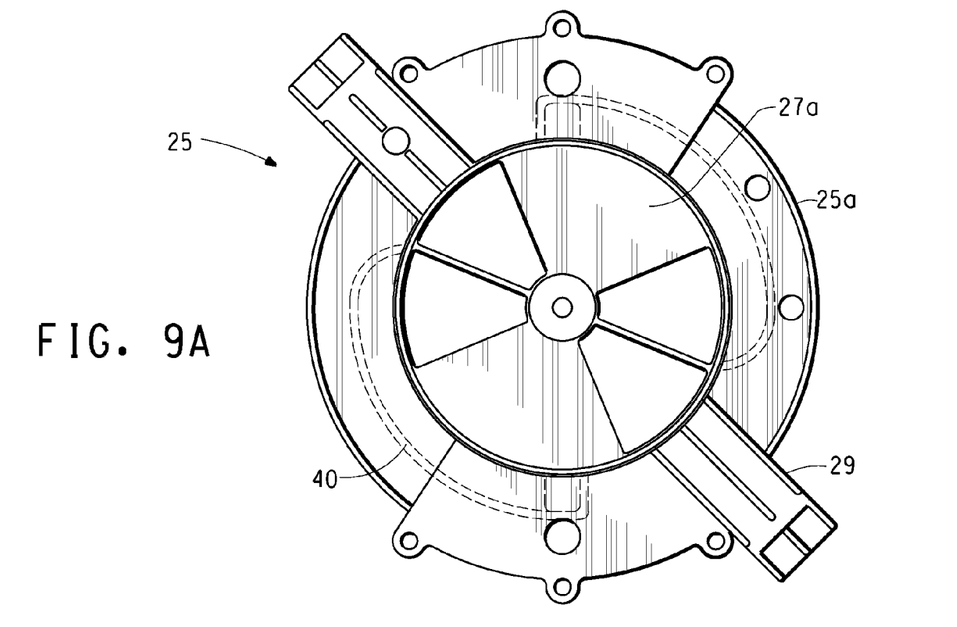
FIGS. 9A and 9B are illustrations of the bottom face of one embodiment of an input transfer valve of a granular dispensing apparatus of the present invention.
Figure 9B:
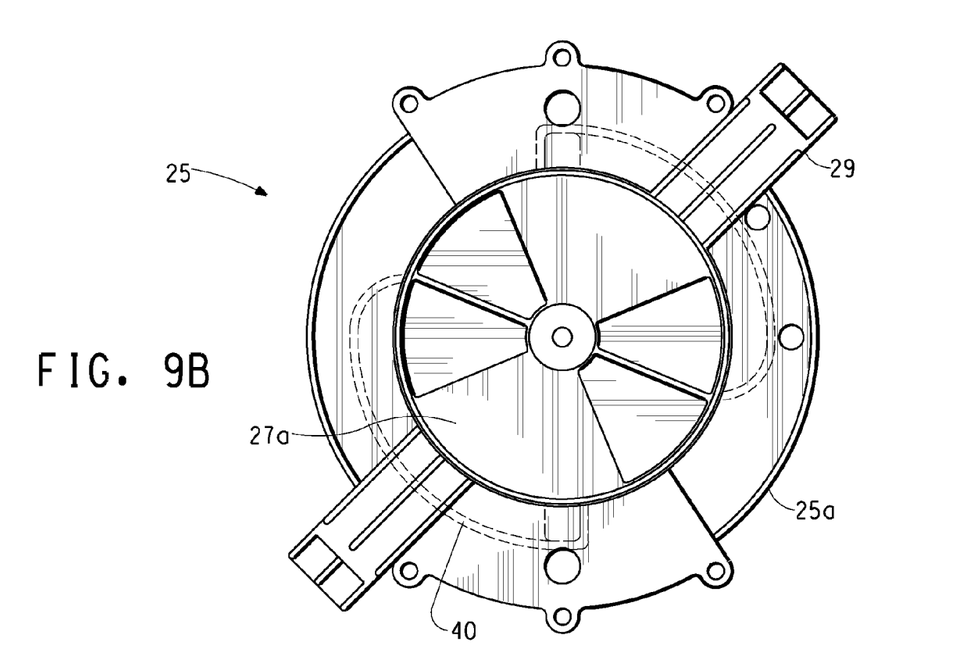

In one embodiment both input transfer valve 25 and output transfer valve 24 are product specific. By "product specific" is meant a material identity preservation design that is configured uniquely for each specific granular material to be measured and dispensed. In one embodiment of the present invention transfer of granular material from hopper 3 is prevented if a product-specific output transfer valve 24 is configured for a different granular material than is product-specific input transfer valve 25. A means for configuring valve design to correspond to specific granular materials is by using physical geometry to prevent cooperative coupling of product-specific output and input transfer valves intended for different granular materials. In one embodiment means of designating and ensuring a specific granular material is used by utilizing at least one product pin 30 located on product-specific output transfer valve 24 and corresponding product hole 28 located on product-specific input transfer valve 25, as shown in FIG. 7A. Product pins 30 and product holes 28 are arranged to ensure that product-specific output transfer valve 24 cannot be mated with product-specific input transfer valve 25 unless product pin 30 properly aligns with hole 28 in product-specific input transfer valve 25. Each arrangement of product pins 30 and complementary arrangement of holes 28 corresponds to a specific granular material. If alignment does not occur, then slide gate key 27 on product-specific input transfer valve 25 will not engage in keyhole 31 in product-specific output transfer valve 24 to allow opening of the coupled input and output transfer valves by rotating valve tab 29. Slide gate key 27 and keyhole 31 have complementary torque-communicating shapes (e.g., hexagonal) such that rotation of rotating valve tab 29 attached to product-specific input slide gate 27*a* and slide gate key 27 also rotates coupled keyhole 31 and attached product-specific output slide gate 31*a* so that product-specific output transfer valve 24 and product-specific input transfer valve 25 open and close in unison (see also FIGS. 9A and 9B).

FIG. 7A further shows that output transfer valve 24 preferably utilizes at least one locator pin 26 to ensure proper alignment when connecting to input transfer valve 25 within which resides a corresponding locator hole 26*a*. Unlike the configurations of product pins 30 and product holes 28, the configurations of locator pins 26 and locator holes 26*a* do not necessarily correspond to specific granular materials.

Fastening means to clamp or lock output transfer valve 24 and input transfer valve 25 together to prevent their separation and possible spillage of granular material can be provided. In one embodiment fastening means clamps output transfer valve 24 and input transfer valve 25 together when said valves are opened and unclamps said valves to allow their separation when said valves are closed. One method of fastening (shown in FIGS. 7A and 7B) involves linking rotating valve tab 29 to at least one locking tab 38 that can reversibly enter locking groove 40 in output transfer valve 24 when output transfer valve 24 and input transfer 25 are joined and input transfer valve 25 valve is closed. Movement of rotating valve tab 29 to open input transfer valve 25 and coupled output transfer valve 24 moves linked locking tab 38 of input transfer valve 25 to a position in locking groove 40 of output transfer valve 24 whereby locking groove 40 restrains locking tab 38 to prevent separation.

Figure 8A:
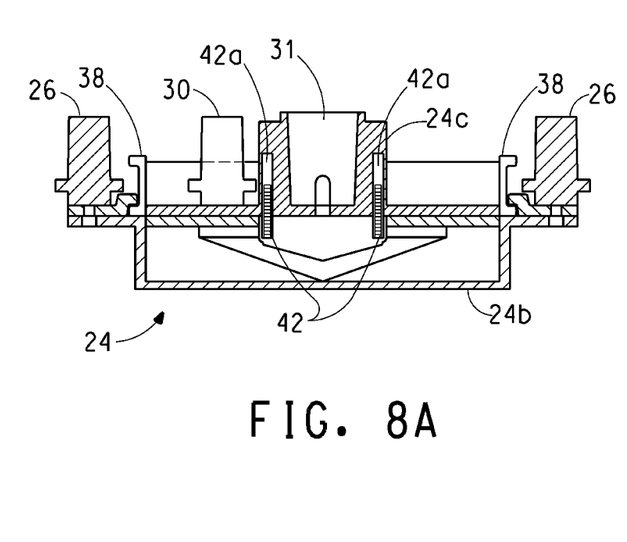
Figure 8B:
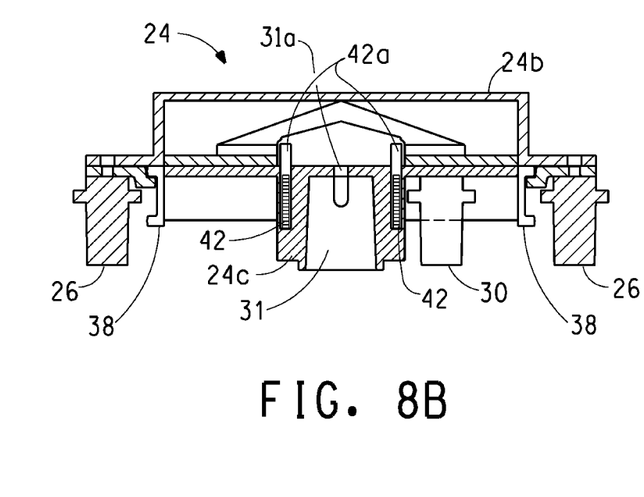

In one embodiment the output transfer valve is one-way. By "one-way" is meant a valve design that permits flow of granular material from hopper 3 when hopper 3 and output transfer valve 24 are oriented for use as shown in FIG. 1, but does not permit flow of material into hopper 3 when hopper 3 and output transfer valve 24 are inverted. A "one-way" design can be accomplished using at least one drop pin 42 which moves by gravity within a corresponding cavity, drop pin cavity 42*a*, formed so that it extends across the boundary between two portions of a valve, upper inner unit 24*b* and lower inner unit 24*c*, which must slide by each other in order to create alignment and permit flow of granular material through them. When the valve is not in the desired orientation (see FIG. 8A), drop pins 42 move by gravity and extend across the said boundary between the sliding valve parts of upper inner unit 24*b* and lower inner unit 24*c* and block any movement, thus preventing flow of material through the valve. When the valve is in the desired orientation (see FIG. 8B), drop pins 42 fall below the said boundary and permit movement of the valve parts to enable flow of material. FIGS. 8A and 8B illustrate one embodiment of a one-way material flow design of output transfer valve 24 and product-specific design of input transfer valve 25 and output transfer valve 24.

Figure 7B:
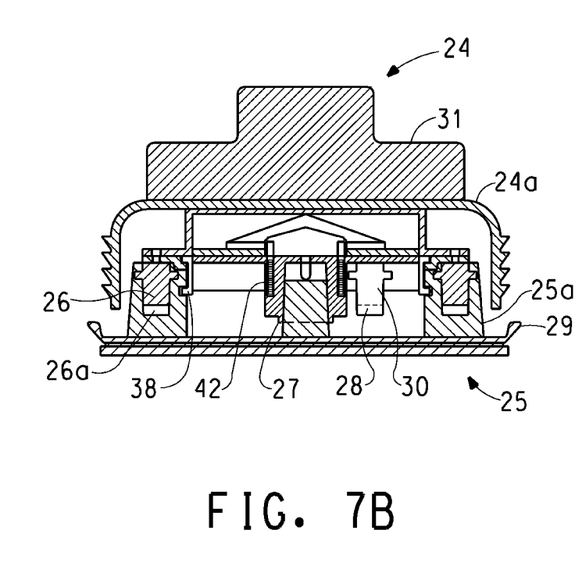

Output transfer valve 24 can be connected to input transfer valve 25 if locator pins 26 and product pins 30 are aligned with their corresponding holes, locator holes 26*a* and product holes 28 respectively. If such alignment occurs, the product-specific input transfer valve 25 mates with product-specific output valve 24 to allow for the transfer of granular material from hopper 3 to reservoir 18, as shown in FIG. 7B.

A dust guard 20 covers the valve assembly 5. A solenoid 19 electrically connected to the control means 1 actuates the valve of the valve assembly 5 to its open position to allow for the flow of granular material to the means for directing granular material 7. Typically, the solenoid 19 is actuated by an electrical surge and is kept activated with a lower voltage. The amount of electrical surge and lower voltage generally depends on the solenoid, but if two different operating voltages are used in the system one could simply be turned off to provide the lower voltage. By way of example only, the electrical surge can range from about 7 volts to about 17 volts and the lower voltage can range from about 1 volt to about 5 volts; other ranges can be utilized. Of note is an electrical surge of about 17 volts and a lower voltage of about 5 volts. Retaining spring 17 closes the valve after being actuated by the solenoid 19. Along with the retaining spring 17, the weight of the granular material keeps the valve in its closed position until actuated by the solenoid 19. The dust guard 20 surrounds the valve assembly 5 and together they are surrounded by a reservoir 18 capable of holding granular material.

Figure 2:
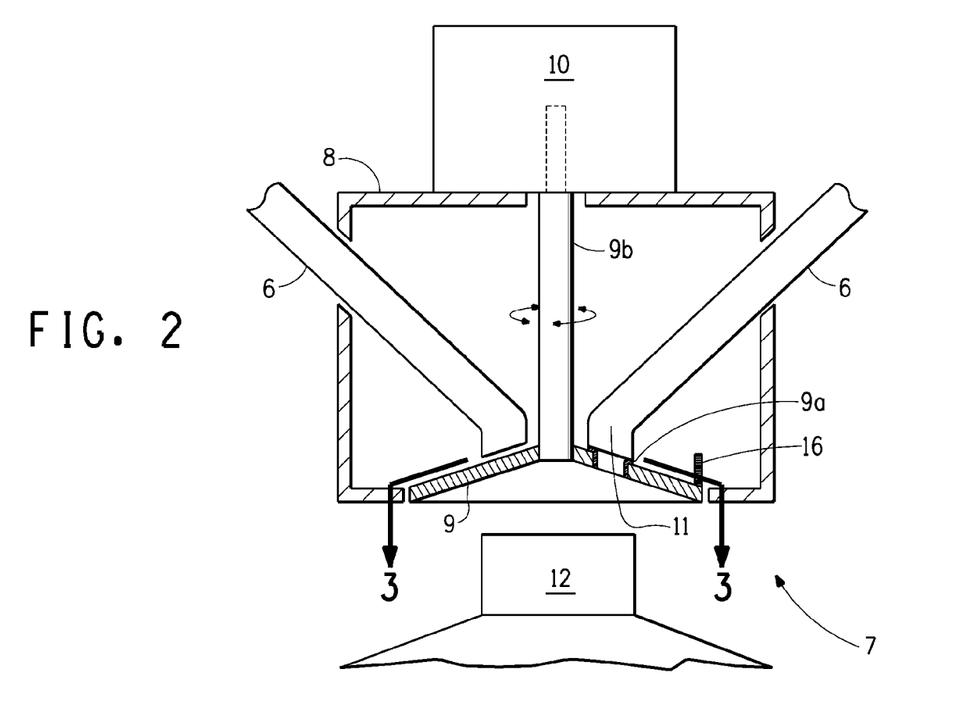
FIG. 2 is an enlarged cross sectional view of one embodiment of the granular dispensing apparatus of the present invention illustrating a portion of a means for directing granular material.

In FIG. 2 is shown means for transferring the granular material 6 from the containing means to the receiving means, said transferring means comprising a tube having two open ends, wherein one open end is attached to the valve assembly 5 of the dispensing means 4 which is in turn attached to each hopper 3 and the opposite open end 11 is capable of close alignment with the opening in the rotatable structure. The rotatable structure can be, for example, a rotatable plate 9, as is shown in FIG. 2. Typically transferring means 6 comprises a separate tube for each hopper. Such tubes can be plastic, rubber or metal and can be flexible or bendable. Highly polished metal tubes can facilitate the flow of the granular material and typically do not produce static charges. Plastic tubes can made from polyvinyl chloride tubing or other flexible or bendable plastic tubing. By "capable of close alignment" is meant that each of the open ends of the tubes 6 are separated from the rotatable structure, such as rotatable plate 9 by a narrow gap sufficient to allow free rotation of the rotatable structure while preventing product contamination.

Figure 3:
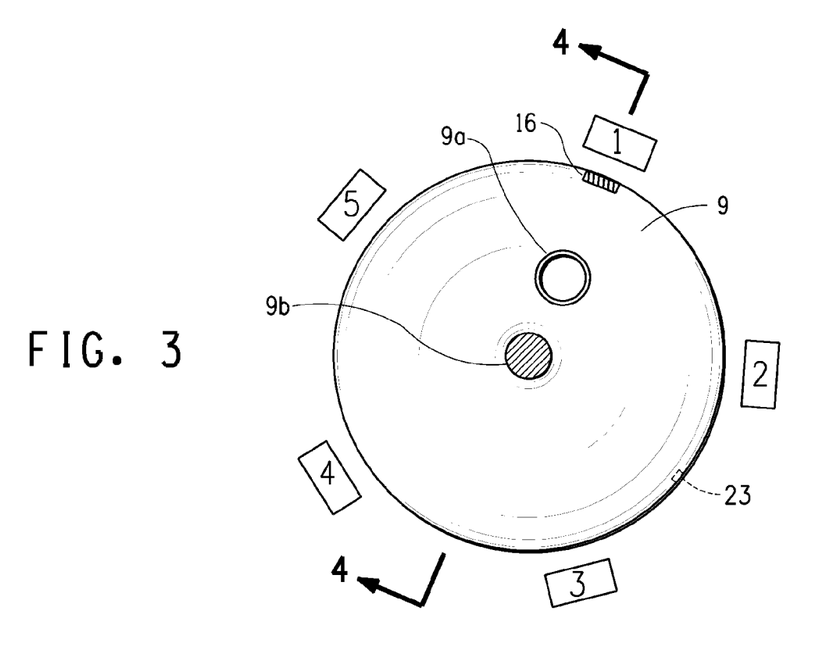
FIG. 3 is a top view of one embodiment of the granular dispensing apparatus of the present invention illustrating a rotatable structure taken along sections 3-3 in FIG. 2.
Figure 4A:
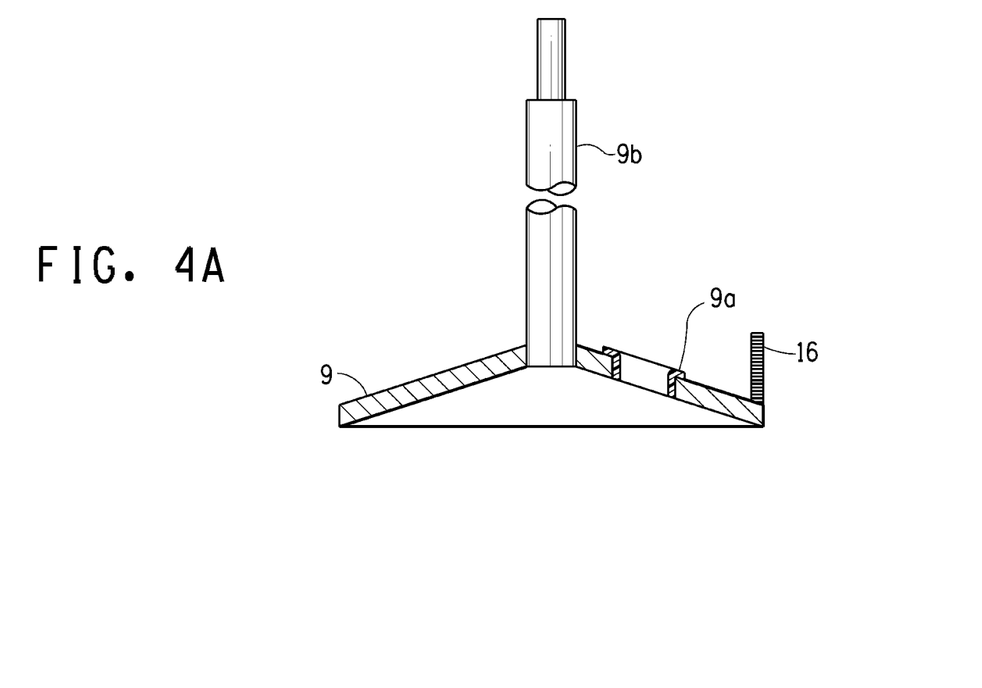
Figure 4B:
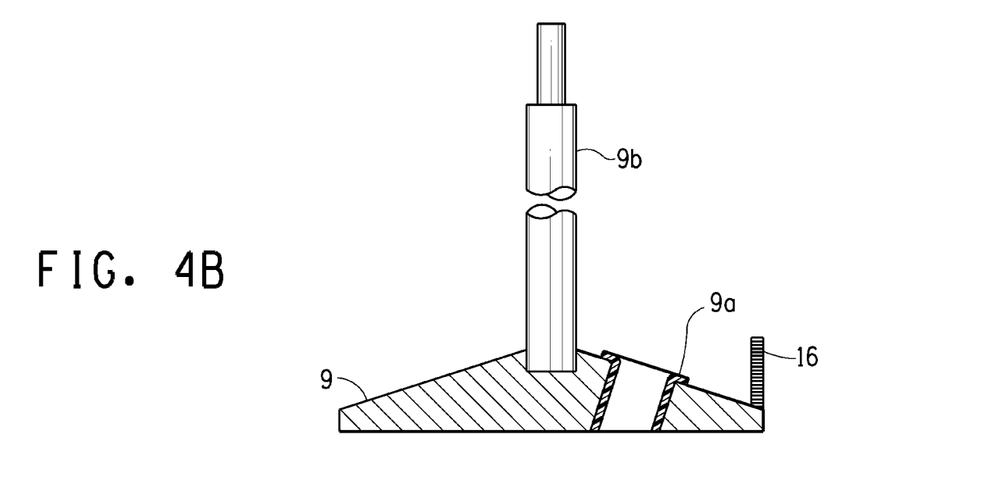
Figure 6:
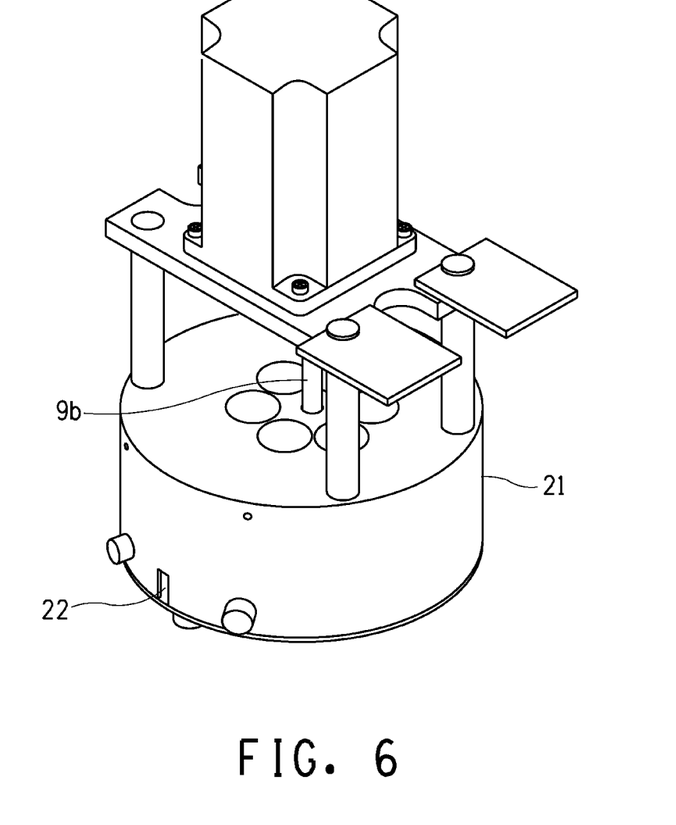
FIG. 6 is a view of one embodiment of the granular dispensing apparatus of the present invention illustrating a design for a housing for a rotatable plate.

The means for directing the granular material 7 as shown in detail in FIG. 2 comprises a housing 8 (or housing 21 as shown in FIG. 6) and a rotatable structure which is shown as a circular plate 9 and has an opening therein surrounded by a ridge 9a. The opening in the rotatable plate can be configured in different manners. In one embodiment granular material flows straight through the rotatable plate, e.g. the entrance and the exit of the opening are in direct alignment with each other as shown in FIGS. 2, 3 and 4A. Alternatively the entrance and the exit of the opening in the rotatable plate can be angled such that they are not in precise axial alignment, e.g. granular material flowing there through will exit the plate at a position closer to the center of the plate then where it entered the rotatable plate as shown in FIG. 4B. This angled configuration can be useful for receptacles having smaller openings. Ridge 9a facilitates close alignment of the opening in rotatable plate 9 and the open end of the tube which is capable of close alignment with the opening in the rotatable plate 9. The rotatable structure, such as rotatable plate 9, can be sloped or angled to facilitate the removal of stray granular material in the unlikely event that granular material inadvertently falls onto the surface of the rotatable structure from one or more of the transfer tubes. The outer edge of the rotatable structure can extend beyond the circumference of the opening in the receptacle such that should any stray particles slide down the slope of the rotatable structure such particles will fall to the outside of the receptacle. The rotatable structure can be machined or molded and can be fabricated from one material or more than one material. Suitable materials for the rotatable structure include metal or rigid, hard plastics, such as thermoplastic polymers including polyvinyl chloride and Delrin® polyoxymethylene, and can be capable of having relatively smooth surfaces. The rotatable structure is connected to rotating means 10 by a shaft 9b. In one embodiment shaft 9b is fabricated as one piece and from one material with the rotatable structure. In another embodiment the one piece and one material embodiment for the shaft and rotatable structure can further comprise ridge 9a. The walls surrounding the opening in the rotatable structure can be unlined or lined in a material which differs from the material from which the rotatable structure is prepared. Each open end 11 of each tube 6 from each of the hoppers 3 is positioned over the rotatable structure. The rotating means 10 is typically an electrical stepping motor. Alternatively, a servo motor can also be used.

In operation, the rotating means 10 is electrically connected to the control means 1 which actuates the rotating means 10 to move the rotatable structure, such as rotatable plate 9, so that the exit for the opening in the rotatable structure is positioned over the means for receiving the granular material shown as receptacle 12. The exit of the opening in receptacle 12 is thus in axial alignment with the opening in the rotatable structure. The dispensing means 4 which is actuated by the control means 1 dispenses the amount of granular material required by the formula for the selected product. The ridge 9a around the opening in the rotatable plate 9 moves to a position of close alignment with the end 11 of the tube 6 which significantly reduces or prevents spillage of granular material when being discharged into the receptacle 12 and thus, prevents contamination of subsequent granular material charged from any of the other hoppers 3.

In FIG. 1, the receiving means is shown as a receptacle 12 and is placed on means for holding the receptacle 13. The receptacle can be a rigid container or can be a flexible bag. Suitable materials for the receptacle can be the same as described herein for the hopper. In one embodiment the flexible bag further comprises a threaded opening. Holding means 13 can be a plastic or metal structure. Such a structure can have a raised edge for facilitating holding the container securely. Alternatively, holding means 13 can comprise a slot positioned between the rotatable structure and the receptacle, which can be shaped to conform to the shape of a portion of the receptacle, such as a threaded opening for certain embodiments utilizing the flexible bag as the receptacle, for the purpose of creating a stop whereby when the receptacle is slid into the slot, the receptacle is securely hung and the opening of the receptacle is positioned in alignment with the opening in the rotatable structure. A cap can be secured onto the threaded opening after completion of the filling cycles to prevent spillage of the selected product.

The holding means 13 is in contact with means for weighing 14, typically an electronic scale that is in communication with the control means 1 typically by electrical feedback means 15, such as a cable or wire which can be shielded, attached to the control means 1. If a sufficient amount of granular material has not been added to the receptacle 12, the control means 1 will signal the dispensing means 4 to dispense an additional amount of granular material until the amount required by the formula for the selected product has been added.

FIG. 3 is a top sectional view of a rotatable structure, shown as a rotatable plate 9, taken at 3-3 (FIG. 2) with shaft 9b showing an opening with a ridge 9a around its circumference and representative filling stations 1 through 5 adjacent to the rotatable plate 9. A magnet or cam lobe 16 is positioned on the rotatable structure, such as rotatable plate 9, adjacent to the opening in the rotatable structure. A filling station is a position that is associated with the location of a corresponding transfer tube 6. As shown in FIG. 3, the magnet or cam lobe 16 is directly opposite filling station 1 which indicates that the rotatable structure is in the correct position for filling receptacle 12. Each of the filling stations 1-5 contain a magnetic switch which is actuated by the magnet or cam lobe 16 when magnet or cam lobe 16 is adjacent to the filling station. When a magnetic or mechanical switch of the filling station is actuated, an electrical signal is sent to the control means 1 which then actuates the dispensing means 4 thereby allowing granular material to flow through the transferring means 6 and through the opening in the rotatable structure and into the receptacle 12. This sequence of steps is repeated for each of the filling stations until all the granular materials are added according to the formula for the selected product.

Plate slot 23 (see FIG. 3) is an optional feature which can be utilized when a corresponding slot 22 is present in housing 8 or 21 (see FIG. 6). Plate slot 23 can be disposed on the circumference of the rotatable structure at any location other than in axial alignment with the magnetic switch of any filling station. In one embodiment plate slot 23 and housing slot 22 have approximately the same width. In the event of an interruption of power to the system, a key can be inserted into housing slot 22 and plate slot 23 to align the rotatable structure and the housing at a home position.

FIGS. 4A and 4B show a cross section of the rotatable plate 9 taken at 4-4 of FIG. 3 with shaft 9b attached to the rotatable plate 9. An opening in the rotatable 9 is provided for directing the flow of the dispensing granular material into the receptacle. A ridge 9a surrounds the opening and a magnet or cam lobe 16 at the edge of the rotatable plate 9 is shown adjacent to the opening.

FIG. 6 shows an embodiment wherein an optional housing is provided for covering the rotatable structure. The housing is shown having six openings which could accommodate up to six transfer tubes. Also shown is optional slot 22 which can be utilized to ensure alignment of the rotatable plate and the optional housing at a home position following an interruption of power to the system.

To operate one embodiment of a system according to the present invention, an operator switches on the controller 1 and enters a Personal Identification Number (PIN) using the controller keypad 2. More than one PIN can be pre-programmed into the controller to allow multiple operators confidential access to the system. Upon acceptance of the PIN, the controller 1 displays a menu with several available operating modes. In order to dispense a product from the unit, "Dispense Mode" is selected. The Dispense Mode allows the operator to enter one or more characters, such as a job number, a customer ID number, etc., which is stored in the controller memory for record-keeping. The operator then selects a specific product to be dispensed from a list that is displayed and selects the size of the desired application area, such as a field, that will be treated with the selected product. The operator is directed to place the appropriate receptacle 12 onto the means for holding the receptacle 13 which is in contact with the weighing means 14 whereupon the controller 1 scans identifying means on the receptacle 12 to verify that it is properly labeled to receive the selected product and that the receptacle is empty. When all conditions have been satisfied, the operator is prompted to press a "START" key on the controller 1 to initiate the dispensing process.

The initial step in the dispensing process comprises a series of internal checks to verify that the correct granular materials are present in the hoppers 3 and that they are available in sufficient quantity to satisfy the operator's selection. If the correct granular materials are available and in sufficient quantity, the rotatable plate 9 of the means for directing the granular material 7 is rotated to the position of the first granular material to be dispensed. The magnetic or mechanical switch in the corresponding filling station which is actuated by the magnet or cam lobe 16 indicates that the rotatable plate 9 is in the proper position and the dispensing means 4 attached to the appropriate hopper 3 is opened to allow granular material to flow down through the tube 6, through the opening in rotatable plate 9, and into the receptacle 12. The granular material is dispensed until the amount required by the formula has been placed into the receptacle 12, whereupon the dispensing means 4 returns to its closed position. If the formula for the selected product requires the addition of more than one granular material, the rotatable plate 9 is rotated to the next filling station by motor 10 so that the opening in rotatable plate 9 is positioned directly below the open end of tube 6 of the second granular material required by the formula of the selected product and the cycle continues until all of the required granular materials have been dispensed into the receptacle 12 according to the formula for the selected product.

The system of the present invention can further comprise a computer and/or printing means in communication with the control means. Information pertaining to a selected product can be stored in the controller or alternatively in the memory of the computer and/or printed onto a label that can be attached to the receptacle. Such information can be selected from the group consisting of the name of the selected product, the granular materials in the selected product, a formula for the selected product, a customer name and related information, the cost of the selected product or the cost of the individual granular materials used to prepare the selected product, a date the product was prepared, an expiration date and combinations of any of the foregoing.

Modification of an existing formula for a product can be accomplished with the system according to the present invention using either the control means alone or together with the computer. Stored upon the control means or the computer will be formulae for existing products. Upon entering into the control means or the computer new information regarding use of a product, such as a different pest or weed to be controlled, a formula for a modified product can be calculated and the modified formula can be fed to the control means if calculated by the computer thereby allowing the system to prepare the modified product. Often such a modified product will require governmental approval and will not be marketed until such approval is obtained.

Similarly, a new product can be prepared using the computer with the system according to the present invention. Formulae for existing products and their related information can be stored in the computer. Upon entering into the computer changes in the crop to be protected, e.g. a different variety of grain, or a different type of pest or weed to be controlled, or a change in the region where the new product is to be used, the computer can calculate a formula for the new product based on the new information and the formulae and related information for existing products. The formula for the new product can be fed to the control means thereby allowing the system to dispense the new product which then can be tested for performance. Generally governmental approvals must be obtained before such a new product can be marketed.

Means for identifying the contents of a hopper or receptacle can optionally be attached to the hoppers and the receptacle that receives the selected product. For example, radio frequency identification chips (hereinafter RFID chips) or bar codes can be used to improve the safety of the products prepared by a system according to the present invention. Such RFID chips or bar codes can be read by a scanner and the information contained within the RFID chip or bar code is fed back to the control means and if the information from the RFID chip or bar code does not match the formula for the selected product, the system will not operate and will signal the operator that an error has occurred which allows the operator to correct the error. For example, RFID chips or bar codes can be attached to each hopper, e.g. placed in or affixed to each hopper, to ensure that the correct granular material as required by the formula for the selected product is in the hopper. An RFID chip or a bar code can also be attached, e.g. placed in or affixed to, the receiving means, typically a receptacle, to ensure that the receptacle size is correct and that the receptacle will not be under-filled or over-filled and that the receptacle is correctly labeled. Typically, the RFID chip or the bar code is an integral part of a label that is attached to the receptacle. The RFID chip or the bar code can contain information selected from the group consisting of a lot number, date of manufacture, expiration date, country code where the product is to be used, and any combinations of the foregoing. Such RFID chips or bar codes could also incorporate unique tags to prevent re-use of the receptacle.

Typically, the system of this invention contains safeguards in the event of a power failure. A generator back-up or a battery powered back-up can be used in the event of a power failure to ensure that a filling cycle has been completed, and generally a formula is printed out indicating the amount of each granular material that has been dispensed to form the selected product and printed on the label of the receptacle. Further, the valves can be made to be capable of automatically reverting to a closed position upon a power failure. The valve assembly could be held closed by the weight of the granular material that is to be dispensed so that there can be no further addition of granular material or the possibility of granular material being in certain elements of the system which could be dispensed once power is restored to the system. A retaining spring can also assist in keeping a valve closed.

In another safeguard embodiment for use in the event of an interruption of power to the system, such as a power failure, realignment of the motor and the rotatable plate can be achieved by programming the motor to stop when it recognizes a particular magnet or cam lobe on the rotatable plate, e.g. a home position. To ensure precise alignment at this home position, plate slot 23 (see FIG. 3) can be provided in the rotatable structure corresponding to housing slot 22 (see FIG. 6) into which a key can be inserted by an operator. By pushing the key through the housing slot and then through the corresponding plate slot both parts can be aligned.

The following is a typical example that illustrates use of the system of this invention to prepare a granular agricultural product.

EXAMPLE

To create a unit area package for 100 acres (40.47 ha) of DuPont™ Affinity® BroadSpec herbicide, a commercial herbicide for wheat, barley and fallow, the operator would select DuPont™ Affinity® BroadSpec from the list on the controller display and enter 100 acres (40.47 hectares) into the keypad of the controller 1. Upon placement and acceptance of a receptacle 12 having an appropriate label, the controller 1 would begin the process of preparing the selected product. The controller 1 would check for the presence and the current inventory of the two granular materials for the selected product, i.e. tribenuron-methyl 50% soluble granules and thifensulfuron-methyl 50% soluble granules, in the hoppers 3. Upon verification that both of the granular materials are available, the controller 1 then would calculate the appropriate amount of both granular materials required to prepare a 100 acre (40.47 ha) batch of DuPont™ Affinity® BroadSpec. Given that the labeled application rate for DuPont™ Affinity® BroadSpec is 0.8 oz per acre (56 g/ha), and that the final composition of DuPont™ Affinity® BroadSpec is 25% tribenuron-methyl and 25% thifensulfuron-methyl, the controller 1 would calculate that 40 oz (1134 g) of each component would be required for the 100 acre (40.47 ha) unit area package. Each granular material would be sequentially dispensed in the manner described previously. When the completed 80 oz (2268 g) unit area package has been dispensed, the controller connected to a printer would print an adhesive label containing information including the name of the selected product, the amount dispensed, the acres (hectares) to be sprayed and other pertinent information which can be affixed to the receptacle 12.

What is clamed is:

1. A system for dispensing a granular product, comprising:
   means for controlling the system;
   means for containing at least two granular materials in a separate arrangement;
   means for dispensing each granular material from the containing means in electrical communication with the control means and capable of holding and releasing the granular material;
   means for directing the granular material comprising a housing, a rotatable structure having an opening therein and means for rotating the structure;
   means for receiving the granular material in axial alignment with the opening in the rotatable structure;
   means for transferring the granular material from the containing means to the receiving means, said transferring means comprising a tube having two open ends, one open end attached to the dispensing means and the opposite open end capable of close alignment with the opening in the rotatable structure;
   means for holding the receiving means; and
   means for weighing the receiving means in contact with the holding means and in electrical communication with the control means;
   whereby the granular product to be prepared is selected by supplying information to the control means, granular material is dispensed from the containing means by the dispensing means as directed by the control means according to a formula for the selected product, the granular material flows through the transferring means, the rotating means moves the rotatable structure to align the opening in the rotatable structure with the open end of the tube capable of close alignment with the opening in the rotatable structure thereby allowing a discharge of the granular material into the receiving means through the opening in the rotatable structure, the weighing means weighs the amount of granular material dispensed into the receiving means and feeds the weight data to the control means and the control means directs the dispensing means to dispense additional granular material when required; the above being repeated for each granular material in the containing means required by the formula for the selected product.

2. The system of claim 1 wherein the containing means comprises at least two hoppers.

3. The system of claim 2 wherein the hopper identifying means is a radio frequency identification chip or a bar code attached to each hopper.

4. The system of claim 2 wherein the dispensing means is attached to each hopper and comprises a valve being held in its closed position by the weight of the granular material in the hopper and on actuation to its open position by the control means dispenses the amount of granular material from the hopper required by the formula for the selected product.

5. The system of claim 4 wherein the valve is further held in its closed position by a spring.

6. The system of claim 2 wherein the transferring means comprises a plastic tube, a rubber tube or a metal tube for each hopper.

7. The system of claim 2 wherein the rotatable structure is a rotatable plate and the opening in the rotatable structure is surrounded by a ridge.

8. The system of claim 1 wherein the rotating means is a motor in electrical communication with the control means.

9. The system of claim 1 wherein the receiving means is a receptacle.

10. The system of claim 9 wherein the receptacle identifying means is a radio frequency identification chip or a bar code.

11. The system of claim 2 wherein the dispensing means for each hopper is electrically activated.

12. The system of claim 11 wherein the rotatable structure has a magnet or cam lobe thereon and the electrical activation is preceded by actuation of a magnetic or mechanical switch upon placement of the magnet or cam lobe adjacent to a filling station.

13. The system of claim 11 wherein the dispensing means is an electrically operated opening mechanism that is opened with an electrical surge and remains open at a lower voltage.

14. The system of claim 13 wherein the electrical surge ranges from about 7 volts to about 17 volts and the lower voltage ranges from about 1 volt to about 5 volts.

15. The system of claim 9 wherein the control means is connected to means for printing capable of printing a label containing information about the selected product for attaching to the receptacle.

16. The system of claim 1 wherein the control means stores information about the selected product, said information selected from the group consisting of a formula, a customer name and related data, cost data, a formulated date and an expiration date, and any combinations of the foregoing.

17. The system of claim 1 wherein the selected product is an agricultural product.

18. The system of claim 17 wherein the control means is connected to a computer upon which is stored data for existing products and upon which is entered new information selected from the group consisting of a change in a crop to be protected, a change in a region where the agricultural product is to be applied, and a change in a pest or a weed to be controlled, and any combination of the foregoing, whereby the computer generates a new formula for a new agricultural product and feeds the new formula to the control means thereby allowing the system to dispense the new agricultural product.

19. The system of claim 2 wherein the containing means further comprises means for identifying the granular material in each hopper.

20. The system of claim 9 wherein the receptacle has means for identifying the selected product attached thereto.

21. The system of claim 16 wherein the control means is connected to a computer.

\* \* \* \* \*